US012186754B2

(12) United States Patent
Broyer et al.

(10) Patent No.: US 12,186,754 B2
(45) Date of Patent: Jan. 7, 2025

(54) MALDI-TOF ANALYSIS PLATE WITH PAPER SUPPORT AND USE THEREOF

(71) Applicant: BIOMÉRIEUX, Marcy l'Etoile (FR)

(72) Inventors: Patrick Broyer, Saint Cassien (FR); Nadine Perrot, Montluel (FR); Jérôme Blaze, La Terrasse (FR); Jean-Marie Baumlin, Anzin Saint Aubin (FR)

(73) Assignee: BIOMÉRIEUX, Marcy l'Etoile (FR)

( * ) Notice: Subject to any disclaimer, the term of this patent is extended or adjusted under 35 U.S.C. 154(b) by 287 days.

(21) Appl. No.: 16/603,687

(22) PCT Filed: Apr. 26, 2018

(86) PCT No.: PCT/FR2018/051056
§ 371 (c)(1),
(2) Date: Oct. 8, 2019

(87) PCT Pub. No.: WO2018/197814
PCT Pub. Date: Nov. 1, 2018

(65) Prior Publication Data

US 2020/0114346 A1 Apr. 16, 2020

(30) Foreign Application Priority Data

Apr. 27, 2017 (FR) ...................................... 1753705

(51) Int. Cl.
*B01L 3/00* (2006.01)
*B01L 9/00* (2006.01)
(Continued)

(52) U.S. Cl.
CPC ................. *B01L 3/508* (2013.01); *B01L 9/50* (2013.01); *H01J 49/0418* (2013.01);
(Continued)

(58) Field of Classification Search
CPC ............ B01L 3/5027; B01L 3/502707; B01L 3/5088; B01L 2300/126; B01L 2300/161;
(Continued)

(56) References Cited

U.S. PATENT DOCUMENTS 5,110,670 A 5/1992 Janocha et al.
6,825,478 B1 11/2004 McCarthy et al.
(Continued)

FOREIGN PATENT DOCUMENTS

EP 1 814 137 A2 8/2007
EP 2 106 858 A1 10/2009
(Continued)

OTHER PUBLICATIONS

International Search Report, dated Jun. 14, 2018, corresponding to International Application No. PCT/FR2018/051056.
(Continued)

*Primary Examiner* — Jill A Warden
*Assistant Examiner* — Dwayne K Handy
(74) *Attorney, Agent, or Firm* — Oliff PLC

(57) ABSTRACT

The invention provides an analysis plate (10) including at least one analysis zone for receiving a sample to be analyzed by mass spectrometry using the MALDI-TOF technique, the plate being of the type having at least one test face (12) with at least one analysis zone defined thereon and of the type in which the plate includes a support (18) that is plane, the plate being characterized in that the support (18) comprises at least one sheet (20) of paper material comprising cellulose fibers, and in that the analysis plate (10) includes at least one ply (24) of metal material.

24 Claims, 10 Drawing Sheets

(51) Int. Cl.
*H01J 49/04* (2006.01)
*H01J 49/40* (2006.01)

(52) U.S. Cl.
CPC ........... *H01J 49/40* (2013.01); *B01L 2300/06* (2013.01); *B01L 2300/0816* (2013.01); *B01L 2300/126* (2013.01); *B01L 2300/161* (2013.01)

(58) Field of Classification Search
CPC ..... B01L 2300/0818; B01L 2300/0816; G01N 2035/00138; H01J 49/0418
See application file for complete search history.

(56) References Cited

U.S. PATENT DOCUMENTS

| | | | | |
|---|---|---|---|---|
| 2005/0072917 | A1 | 4/2005 | Becker | |
| 2005/0090016 | A1 | 4/2005 | Rich et al. | |
| 2005/0139470 | A1 | 6/2005 | Sze | |
| 2007/0001114 | A1 | 1/2007 | Goodley et al. | |
| 2008/0245970 | A1 * | 10/2008 | Fattinger | G01N 1/28 250/432 R |
| 2010/0133098 | A1 * | 6/2010 | Hafeman | B01L 3/50255 204/403.01 |
| 2014/0008115 | A1 | 1/2014 | Sato et al. | |
| 2015/0132742 | A1 * | 5/2015 | Thuo | B01L 3/502707 435/5 |

FOREIGN PATENT DOCUMENTS

| | | |
|---|---|---|
| EP | 2 792 471 A1 | 10/2014 |
| EP | 2 808 887 A1 | 12/2014 |
| GB | 2 006 109 B | 5/1979 |

OTHER PUBLICATIONS

Chinese Office Action, dated Mar. 19, 2021, corresponding to Chinese Application No. 2018800279020.

* cited by examiner

MALDI-TOF ANALYSIS PLATE WITH PAPER SUPPORT AND USE THEREOF

The present invention relates to the field of microbiology. More precisely, the invention relates to analyzing a biological sample by using mass spectrometry, and it relates in particular to matrix-assisted laser desorption/ionization-time of flight (MALDI-TOF) spectrometry.

The MALDI-TOF technique has been used for several years for quick identification of microorganisms at species level.

A microorganism is identified from the MALDI-TOF mass spectrum of the proteins that are the most abundant in the microorganism, by comparison with reference data, thereby enabling the family, the genus, and usually the species of the microorganism to be identified. On a routine basis, the protocol used comprises depositing at least a portion of a colony of the microorganism on a MALDI plate, adding a matrix adapted to the MALDI technique, acquiring the mass spectrum, and identifying the species by comparison with reference data stored in a database. More recently, the MALDI technique has also been used for detecting the resistance of a microorganism to an antibiotic, and in particular for identifying a phenotype that is responsible for hydrolizing antibiotics of the beta-lactam type, owing to the secretion of enzymes of the beta-lactamase type, and in particular of the carbapenemase type.

Various apparatuses for performing such characterization are sold by the Applicant, and also in particular by the suppliers Bruker Daltonics and Andromas, which apparatuses comprise in particular a laser source of ionization and a time-of-flight mass spectrograph. Such apparatuses are thus designed to operate with an analysis plate on which a biological sample for analysis is deposited on at least one analysis zone, which sample is subsequently covered by the matrix adapted to the MALDI technique. Thereafter, the analysis plate is inserted into an analysis chamber of the apparatus, which chamber is taken to a relatively high level of vacuum, e.g. with a pressure that is less than $10^{-5}$ millibars (mbar), e.g. lying in the range $10^{-6}$ mbar to $10^{-9}$ mbar.

Under such vacuum conditions, the population of one or more microorganisms placed within the MALDI matrix is subjected to gentle ionization by laser. The laser beam used for ionization may have any type of wavelength that is suitable for subliming or vaporizing the matrix. Preferably, an ultraviolet, or even an infrared wavelength is used. By way of example, the ionization may be performed with a nitrogen laser emitting an ultraviolet (UV) spectrum line at 337.1 nanometers (nm).

The matrix then absorbs energy from the photons, and restitution of this energy leads to the matrix subliming, to molecules present in the population of one or more microorganisms being desorbed, and to material appearing in a state that is referred to as a "plasma". Within the plasma, charges are exchanged between molecules coming from the matrix and molecules coming from the microorganisms. For example, protons may be torn from the matrix and transferred to the proteins, to the peptides, and to the organic compounds present in the analysis zone. This step enables the molecules present to be ionized gently without causing them to be destroyed. The population of one or more microorganisms thus releases ions of different sizes. These ions are then accelerated by an electric field, and they fly freely in a tube under low pressure, referred to as a "flight tube". The smallest ions then "travel" more quickly than larger ions, thereby enabling them to be separated. A detector is situated at the terminal end of the flight tube. The times-of-flight (TOS) taken by the ions are used to calculate their masses. Thus, a mass spectrum is obtained, representing the magnitude of the signal corresponding to the number of ionized molecules of given mass divided by charge [m/z], as a function of the ratio m/z of the molecules that strike the detector. The ratio of mass over charge [m/z] is expressed in Thomsons [Th]. After the analysis plate has been inserted in the mass spectrometer, and once the required level of vacuum has been reached, the spectrum can be obtained very quickly, usually in less than one minute.

In the context of the invention, MALDI-TOF analysis may be simple MALDI-TOF analysis, or it may be MALDI-TOF TOF analysis.

A MALDI analysis plate presents at least one analysis zone, and generally a plurality of analysis zones. The analysis zones form respective spots, which are usually circular in shape. In order to facilitate subsequent ionization, the surface of the plate is generally conductive, at least in the analysis zone(s). By way of example, such an analysis plate is generally made of metal, or is made of a polymer such as polypropylene, which polymer is covered in a layer of stainless steel. The polymer may contain a conductive material such as carbon black. By way of example, such a plate may be the plate sold by the supplier Shimadzu, under the reference "Fleximass™ DS disposable MALDI targets".

Various MALDI plates are commercially available, such as VITEK® MS plates from BioMérieux (disposable) and Maldi Biotarget plates from Bruker Daltonics (reusable). Such plates usually have 48 to 96 analysis zones or spots, together with at least one, or indeed two or three, reference analysis zones that might be of a size that is different from the analysis zones.

In general manner, it is considered that analysis plates for MALDI-TOF analysis need to comply with geometrical characteristics that are very stringent, in particular characteristics concerning the thickness of the analysis plate and the flatness of its test face, both of which need to be very accurate. Specifically, MALDI-TOF analysis relies in particular on comparing the times of flight of the various particles that result from the ionization. It can thus very easily be understood that a time of flight depends on the distance to be travelled, and thus on the sample occupying an initial position that is accurate. Document EP 2 106 858 describes an analysis plate having its surface structured in order to modify wetting. That analysis plate is for performing analysis by mass spectrometry, but the nature of the analyzer for performing the analysis is not specified. The person skilled in the art thus certainly did not envisage using such a structured analysis plate for mass spectrometry analysis in which the analysis is based on measuring flight times of ionized particles.

Document EP 1 814 137 describes an analysis plate comprising a substrate and a measurement element that are distinct and that are electrically in contact. Document EP 2 792 471 describes a MALDI analysis plate made out of polymer material, with a hydrophobic agent. The analysis plate is not coated in a ply of metal material. Document EP 2 808 887 describes an analysis plate for MALDI-TOF analysis, which plate comprises a base plate made of metal material covered in a layer of highly-oriented graphite, which layer is assembled on the base plate by an electrically-conductive adhesive.

Certain plates for MALDI-TOF analysis are reusable. That implies that, between two uses, the analysis plate needs to be cleaned and decontaminated, e.g. with a solvent. It is therefore necessary for the plate to be capable of withstanding the cleaning/decontamination process without being damaged, which complicates the manual procedure for using this type of analysis plate and lengthens the time needed for using the complete MALDI-TOF process, in particular by requiring a preparation time that is longer and more labor-intensive. Other analysis plates are for single use, e.g. being made out of polymer material. Until now, the unit cost of such plates has remained high. There is thus a need to reduce the cost of fabricating such analysis plates.

For this purpose, the invention provides an analysis plate including at least one analysis zone for receiving a sample to be analyzed by mass spectrometry using the MALDI-TOF technique, the plate being of the type having at least one test face with at least one analysis zone defined thereon and of the type in which the plate includes a support that is plane, the plate being characterized in that the support comprises at least one sheet of paper material comprising cellulose fibers, and in that the analysis plate includes at least one ply of metal material.

According to other characteristics of the invention, that are optional, taken singly or in combination:

- The ply of metal material is applied to the paper material sheet on the same side as the test face.
- The ply of metal material is applied to the paper material sheet by subjecting the paper material sheet to vacuum metallization.
- The ply of metal material is applied to the paper material sheet by transfer metallization.
- The metal material ply presents thickness of less than 0.5 micrometers (μm).
- The metal material ply comprises aluminum.
- The fibers of the paper material sheet comprise cellulose fibers exclusively.
- The paper material sheet comprises both cellulose fibers and synthetic fibers, in particular synthetic polymer fibers.
- The paper material sheet comprises cellulose fibers and synthetic fibers, with the weight of the cellulose fibers being greater than the weight of the synthetic fibers.
- The paper material of the paper material sheet includes at least one hydrophobic agent.
- The paper material sheet presents grammage greater than or equal to 120 grams per square meter ($g/m^2$), preferably greater than or equal to 150 $g/m^2$.
- The paper material sheet presents grammage less than or equal to 400 $g/m^2$, preferably less than or equal to 300 $g/m^2$.
- The support is constituted exclusively by paper material.
- The support includes at least one supporting blade on which the paper material sheet is applied.
- The support includes at least one supporting blade made of polymer material on which the paper material sheet is applied.
- The support includes two superposed supporting blades of polymer material, and the paper material sheet is applied to a face of one of the two superposed supporting blades.
- The polymer material supporting blade presents thickness lying in the range 0.2 millimeters (mm) to 2 mm.
- The paper material sheet presents grammage lying in the range 60 $g/m^2$ to 200 $g/m^2$.
- The paper material sheet is adhesively bonded on the supporting blade.
- The paper material sheet includes at least one deformation that is obtained mechanically and that follows the outline of at least one analysis zone, thereby defining the at least one analysis zone.
- At least one analysis zone on the paper material sheet includes a deformation that is obtained mechanically and that extends over the entire extent of said analysis zone.
- The analysis plate includes ink marking defining at least one analysis zone.

The invention also provides the use of an analysis plate having any of the above characteristics as a sample support in a method of analyzing the sample by mass spectrometry using the MALDI-TOF technique.

In such a use, the analysis plate may be used with an adapter that holds the paper material sheet by its periphery. Such an adapter may comprise a tray, a frame, and a clamping mechanism that causes the analysis plate to be clamped between the frame and the tray, the frame cooperating with the periphery of the analysis plate and including an opening that allows at least one analysis zone of the analysis plate to appear.

Various other characteristics appear from the following description made below with reference to the accompanying drawings, which show embodiments of the invention as nonlimiting examples.

FIG. 1 is a diagrammatic perspective view of an analysis plate of the invention.

FIGS. 2, 3A, and 3B are diagrammatic cross-sectional views showing three variant embodiments of an analysis plate of the invention, without a supporting blade.

Various other characteristics appear from the following description made below with reference to the accompanying drawings, which show embodiments of the invention as nonlimiting examples.

Figure 1:
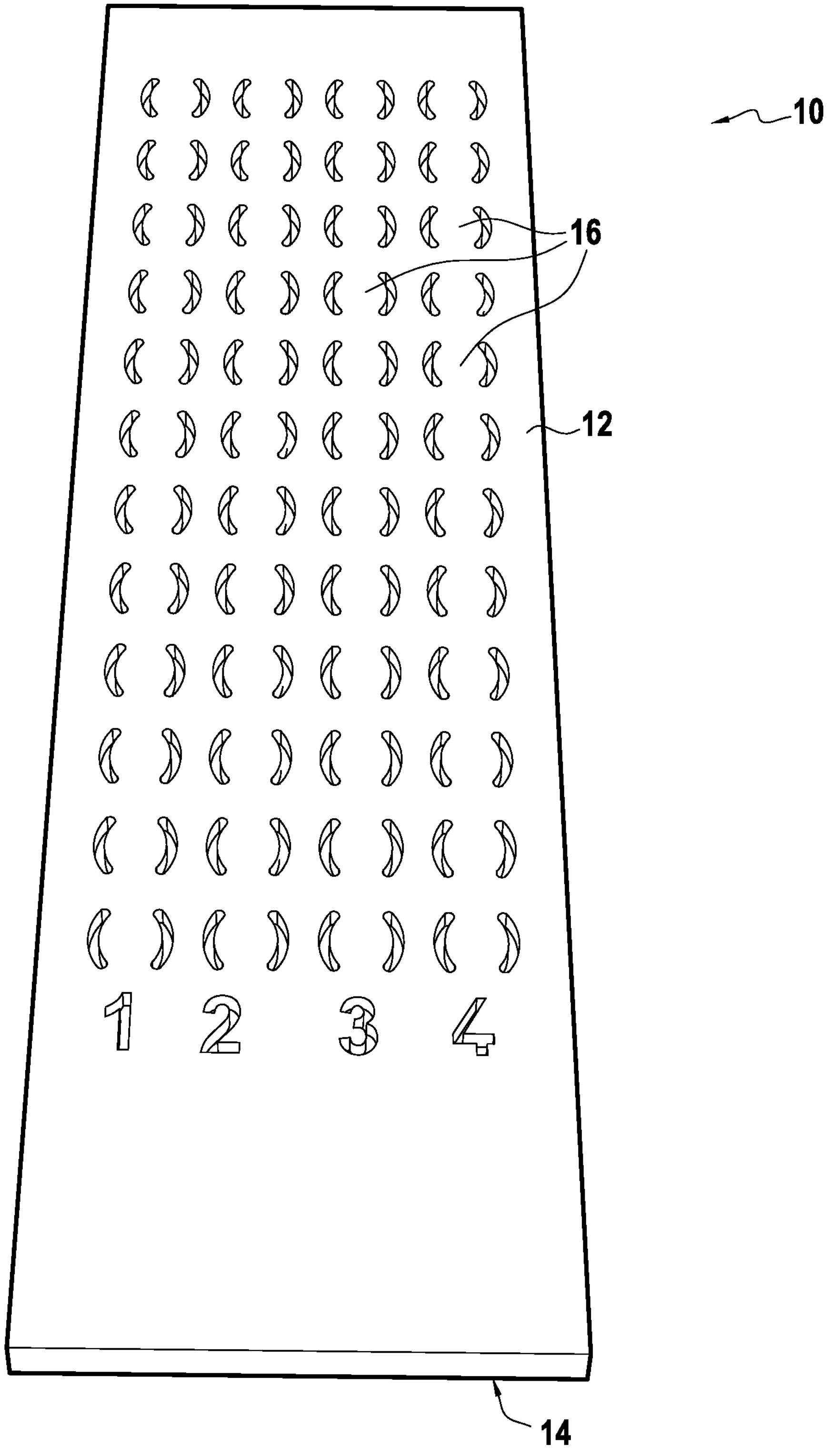
Figure 2:
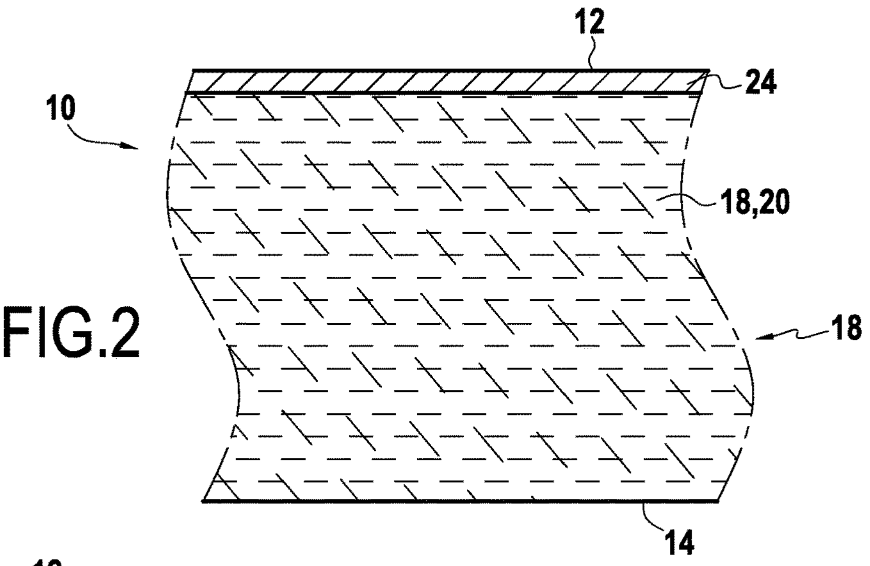

FIGS. 1 and 2 show a first example of an analysis plate 10 made in accordance with the invention.

By way of example and in known manner, the analysis plate 10 presents a shape that is plane and that extends in an extension plane. By way of example, in a direction perpendicular to its extension plane, the analysis plate 10 presents thickness that is less than one tenth of the short dimension of the plate as measured in its extension plane, commonly referred to as its "width". The analysis plate 10 thus presents a test face 12 and a back face 14 that extend parallel to the extension plane. The test face 12 is the place on which there is provided at least one analysis zone, and in the example shown a plurality of analysis zones 16, each of which is to receive a biological sample for analysis. In the example shown, the analysis plate 10 thus presents 48 analysis zones that are arranged in four columns, each of twelve analysis zones. Nevertheless, because of the low cost of an analysis plate 10 of the invention, provision may be made for it to have a small number of analysis zones, e.g. one, two, four, five, or eight analysis zones 16.

For example, in its extension plane, the analysis plate 10 may present a short dimension lying in the range 10 mm to 50 mm, e.g. 25 mm, and a long dimension lying in the range 50 mm to 100 mm, e.g. 75 mm.

By convention, it is considered below that the analysis plate 10 extends in a plane that is horizontal, and that the test face 12 is a top face while the back face 14 is a bottom face of the analysis plate 10.

Preferably, each analysis zone 16 is visually distinguished from the remainder of the test face 12 of the analysis plate 10. In the example shown, each analysis zone 16 is substantially circular in shape.

The analysis plate 10 may also include reference analysis zones (not shown in the figures), which may be used for calibrating the apparatus in the context of MALDI-TOF analysis, for example.

According to the invention, the analysis plate 10 comprises a planar support 18, which itself comprises at least one sheet 20 of paper material comprising cellulose fibers. The paper material sheet 20 thus presents an extension plane corresponding to the extension plane of the analysis plate 10.

The paper material is a material that is made up of agglomerated fibers, the fibers comprising cellulose fibers. By way of example, the cellulose fibers are of plant origin. The fibers of the paper material are obtained by the papermaking technique. In this technique, fibers are dispersed in an aqueous solution, possibly with added auxiliary materials (fillers, dyes, adhesive, etc. . . . ), thereby forming papermaking pulp. The papermaking pulp is spread as a thin coating on a perforated (fourdrinier) table enabling a major portion of the water contained in the papermaking pulp to be drained. Various pressing and drying operations on the thin coating cause the fibers to agglomerate, thereby imparting cohesion to the paper material sheet 20. In known manner, a paper material sheet 20 may be subjected to surface treatments, e.g. seeking to deposit one or more layers of additive materials on the surface of the sheet in order to modify the surface state of the paper material sheet. The paper material sheet may also be subjected to mechanical treatments, in particular to calendaring, to embossing, etc. . . . also seeking to modify the surface state of the paper material sheet.

In certain embodiments of the invention, the fibers of the paper material sheet 20 may comprise cellulose fibers exclusively. That means that the fibers of the paper material sheet 20 comprise cellulose fibers only, although with the exception of fiber impurities possibly being present. Preferably, such fiber impurities represent less than 2% by weight of the weight of the paper material. This magnitude may be measured in compliance with the TAPPI T401 standard.

In the present application, the weight of the paper material sheet per square meter, also known as its "grammage", is measured in compliance with the ISO 536 standard.

Nevertheless, in certain embodiments, provision may be made for the paper material sheet to comprise both cellulose fibers and non-cellulose fibers, in particular glass fibers and/or synthetic polymer fibers. Synthetic polymer fibers may comprise in particular polyester fibers, polyethylene fibers, or polylactic acid (PLA) fibers. One of the advantages of adding non-cellulose fibers, as envisaged above, is to enable the layer of paper to retain less moisture in the event of being exposed to a humid atmosphere. By way of example, the non-cellulose fibers may comprise:

- glass microfibers from the supplier Lauscha Fiber International, e.g. B-08-F borosilicate fibers having a diameter of 0.8 μm;
- Cyphrex synthetic polymer fibers from the supplier Eastman, e.g. Cyphrex™ 10001 polyethylene terephthalate (PET) fibers having a diameter of 2.5 μm and a length of 2.5 mm; and
- synthetic polymer fibers from the supplier Advansa, e.g. Advansa 328 NSD polyester fibers having a length of 6 mm and a weight per unit length of 1.7 decitex (dtex), or Advansa PLA fibers made of PLA having a length of 3 mm and a weight per unit length of 1.7 dtex.

Specifically, when using the analysis plate of the invention having at least one paper material sheet 20, it has been found that the moisture absorbed by the paper material sheet 20 can slow down the step of evacuating the analysis chamber in which the analysis sheet is inserted for MALDI-TOF analysis. This slowdown can be countered by increasing the pumping capacity of the MALDI-TOF installation. It can also be countered by appropriately packaging the analysis plate before it is used. Thus, an analysis plate 10 of the invention should advantageously be stored in packaging that is waterproof against humidity. By way of example, a packaging may be made that comprises a sheet of aluminum completely enclosing the analysis plate 10. Provision may be made for the analysis plate to be packaged under a controlled atmosphere, preferably while ensuring that the atmosphere inside the packaging is as dry as possible, and possibly by providing a desiccant dehumidifier inside the packaging. In particular, it is advantageous to provide an internal atmosphere with relative humidity of less than 5%. Relative humidity may be measured by using a calibrated hygrometer. Relative humidity can then be calculated on the basis of the formulae defined in the NF X 15-110 standard.

Thus, by constructing the paper material sheet 20 in such a manner that it is less liable to retain moisture in the event of being exposed to a humid atmosphere, the characteristics of the analysis plate 10 including such a paper material sheet are improved, in particular by reducing the time required for evacuation in order to perform the analysis.

Nevertheless, in the presence of synthetic fibers, provision is preferably made for the paper material sheet to present a ratio of the weight of non-cellulose fibers over the total weight of the fibers of the paper material sheet to be less than 50%. For a given paper, this value may be measured using the Tappi 401 method.

The ability of the paper material sheet to withstand absorbing moisture may also be obtained by other means.

In a variant, provision may be made to treat a previously-formed paper material sheet by impregnating it with a hydrophobic material, e.g. a material containing paraffin. Among suitable hydrophobic materials, mention may be made of:

- Vapor Coat® 2200.E from the supplier Michelman;
- Diofan® A050 from the supplier Solvay based on polyvinylidene chloride (PVDC); and Aquacer 497 from the supplier BYK Additives & Instruments, which is a paraffin-based wax emulsion.

Nevertheless, it is also possible, on the contrary, to ensure that no paper material sheet of the analysis plate contains a hydrophobic agent and/or that the analysis plate does not contain any paper material sheet that has been treated by being impregnated with a hydrophobic material containing paraffin. Provision may be made for the analysis plate to contain no waxed paper and/or no paraffin paper.

In another variant, provision may be made to treat a previously-formed paper material sheet, e.g. by dipping it in an acid, e.g. sulfuric acid. On coming into contact with acid, a portion of the cellulose of cellulose fibers is transformed, thereby resulting in the paper material sheet that has been treated in this way presenting greater resistance to taking up moisture.

As described below, the analysis plate 10 may include elements other than the paper material sheet 28.

The analysis plate 10 may comprise a plurality of paper material sheets. Under such circumstances, the paper material sheets are advantageously superposed on one another, preferably over the entire extent of the analysis plate 10 in its extension plane. The various paper material sheets may be assembled to one another, e.g. by adhesive. Under such circumstances, it is preferable to use a single-component polyurethane adhesive, or a two-component polyurethane adhesive without solvent or based on a solvent, which is preferably not aqueous. The adhesive may be applied by spraying or by means of a roller. It is possible to use an adhesive that is ultraviolet activated. It is also possible to use a double-sided adhesive film. It is then preferable to use a film of the smallest possible thickness.

For an analysis plate 10 comprising a plurality of paper material sheets, the paper material sheets may be identical or not identical. The paper materials constituting the paper material sheets, their grammage, and/or their thickness, etc. . . . may be identical or different. Likewise, the paper material sheets may be of dimensions that are different, e.g. having at least one different dimension in the extension plane of the analysis plate 10.

Figure 3A:
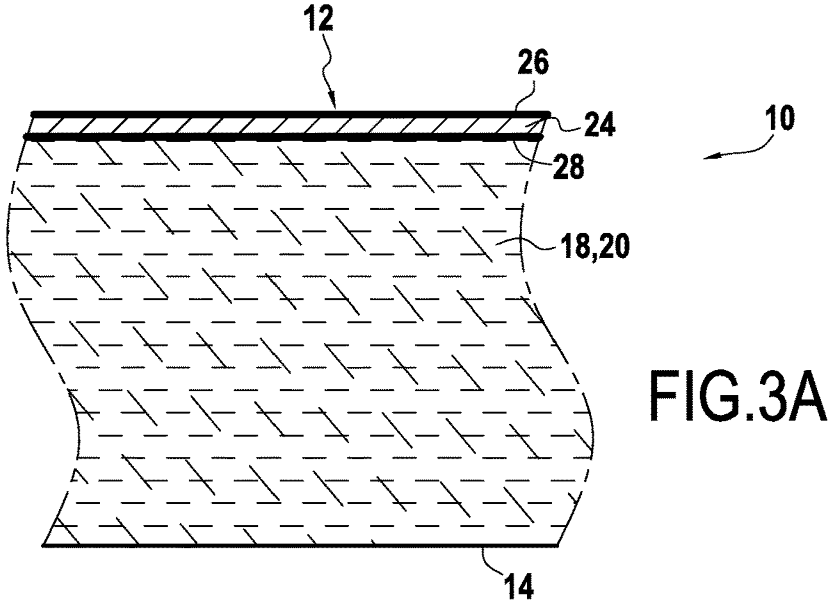
Figure 3B:
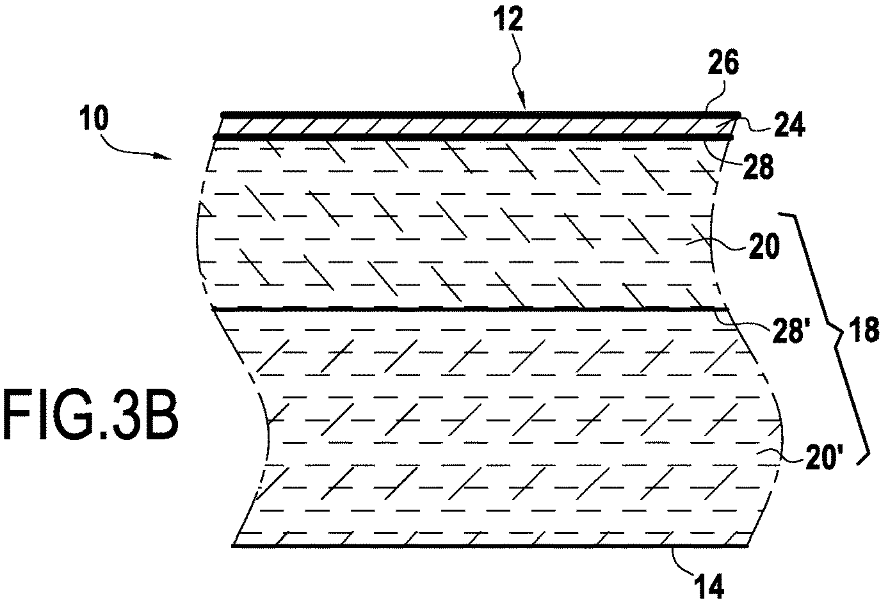

Under certain circumstances, and as shown in FIGS. 2, 3A, and 3B, the support 18 of the analysis plate 10 is made exclusively out of paper material. That does not prevent the analysis plate 10 also having additional layers or plies, as described below. Nevertheless, under such circumstances, it is considered that the support 18, which imparts essentially all of its mechanical rigidity to the analysis plate, is made exclusively out of paper material. For any support constituted exclusively by a plurality of paper material sheets, the presence of an adhesive, in particular a paste, or of other assembly means between the various paper material sheets, does not prevent the support as being considered as being constituted exclusively by paper material.

When the support 18 of the analysis plate 10 is constituted by a single paper material sheet 20, as shown in FIGS. 2 and 3A, the sheet preferably presents grammage greater than or equal to 120 g/m$^2$, more preferably greater than or equal to 150 g/m$^2$. When the support 18 of the analysis plate comprises a plurality of paper material sheets, as shown in FIG. 3B, the sum of the grammages of the paper material sheets of the support is preferably greater than or equal to 120 g/m$^2$, and more preferably greater than or equal to 150 g/m$^2$. Specifically, it has been found that this grammage makes it possible to obtain rigidity that is sufficient for the analysis plate to be easy to handle when used for MALDI-TOF analysis, and above all to guarantee a shape that is sufficiently plane, including after handling, to avoid disturbing the measurements taken by MALDI-TOF.

Preferably, the analysis plate 10 presents paper material of grammage less than or equal to 400 g/m$^2$, preferably less than or equal to 300 g/m$^2$, in one sheet or shared between a plurality of sheets. Specifically, even in the presence of a single sheet of paper material and/or even when the analysis plate 10 is constituted exclusively by paper material, it is found that such grammage makes it possible to obtain rigidity that is more than sufficient for the analysis plate. Above such grammage, there is a risk of increasing the likelihood of the analysis plate 10 storing moisture, which, as explained above, slows down use by requiring a longer time to evacuate the analysis chamber in a MALDI-TOF analysis apparatus.

Thus, the paper material sheet 20 used in the analysis plate 10 of the invention preferably presents thickness lying in the range 100 μm to 450 μm, as measured in compliance with the NF EN ISO 534 standard. For an analysis plate comprising a plurality of paper material sheets, the combined thickness of the paper material sheets, after they have been assembled together to form the analysis plate, preferably lies in the range 100 μm to 1000 μm as measured in compliance with the NF EN ISO 534 standard.

Preferably, the paper material sheet 20 presents little roughness, at least on its face facing towards the test face 12 of the analysis plate 10. For example, this roughness, as measured in compliance with the Bendtsen method as defined in the ISO 8791-2:2013 standard may have a value of less than 750 milliliters per minute (mL/min), preferably less than 500 mL/min.

Figure 4A:
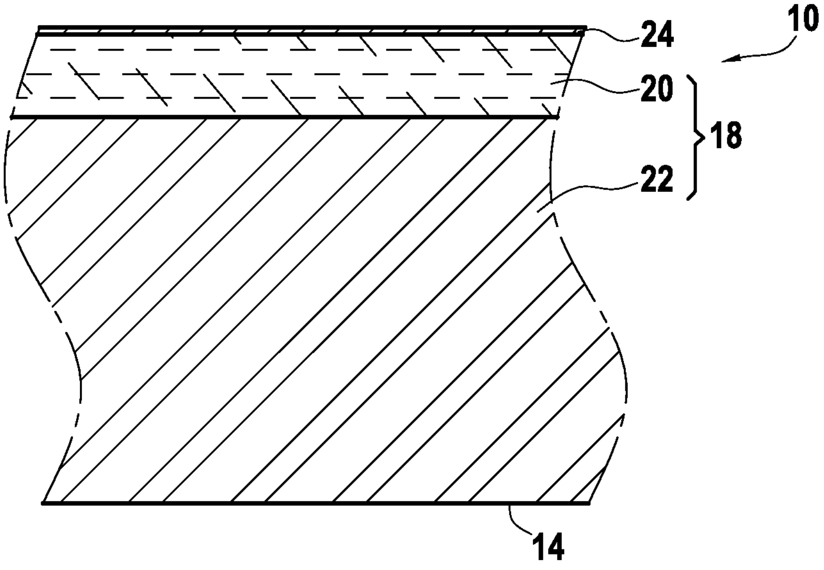
FIGS. 4A and 4B are diagrammatic cross-sectional views showing two variant embodiments of an analysis plate of the invention, respectively with one supporting blade and with two supporting blades.

In certain embodiments of the invention, provision may be made for the support 18 to include at least one supporting blade 22 on which the paper material sheet 20 is fitted. Under such circumstances, the support 18 thus comprises at least two elements, namely the supporting blade 22 and the paper material sheet 20, e.g. as shown in FIG. 4A.

Under such circumstances, the supporting blade 22 is preferably plane in shape, extending parallel to the extension plane of the analysis plate 10. By way of example, in the direction perpendicular to its extension plane, the supporting blade 22 presents thickness that is less than one tenth of the short dimension of the plate as measured in its extension plane.

Preferably, and applying the above-specified convention, the supporting blade 22 is arranged under the paper material sheet 22 or the plurality of paper material sheets. Thus, the supporting blade 22 preferably presents a bottom face that forms the back face 14 of the analysis plate 10.

By way of example, the supporting blade 22 may be made out of polymer material, e.g. out of polypropylene or out of a material based on polypropylene. In an example, the supporting blade is a Priplak® Classic Black 800 polypropylene plate having a thickness of 800 μm.

Such a support plate may be laminated with a plate of the same type using a Super-Lok® 364 paste from the supplier National Starch.

Particles and/or fibers or other additives may be embedded in the polymer material, in particular electrically-conductive particles and/or fibers, in particular metal or metal-based particles and/or fibers, and/or carbon particles and/or fibers.

Advantageously, the supporting blade 22 may come from a strip of material that is obtained by extrusion. Advantageously, the supporting blade 22 can thus be obtained as a very long strip prepared as a roll or a plate, and thus presented in a manner that is analogous to the paper material obtained at the outlet from a papermaking machine.

Advantageously, the paper material sheet 20 and the supporting blade 22 may be assembled together, e.g. by adhesive. Under such circumstances, it is preferable to use a single-component polyurethane adhesive, or a two-component polyurethane adhesive without solvent or based on a solvent, which is preferably not aqueous. The adhesive may be applied by spraying or by means of a roller or directly by computer. It is possible to use an adhesive that is ultraviolet activated. It is also possible to use a double-sided adhesive film. It is then preferable to use a film of the smallest possible thickness.

Figure 4B:
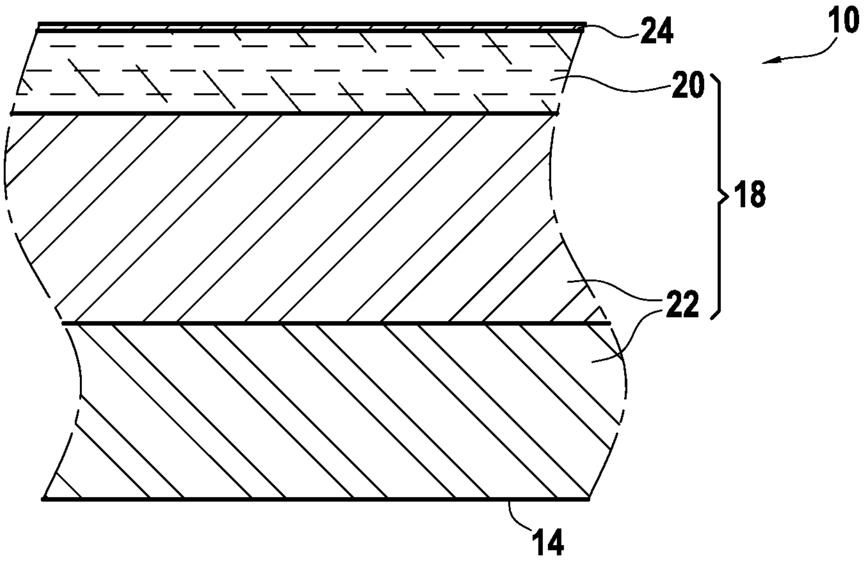

As shown in FIG. 4B, the support 18 may include a plurality of supporting blades, in particular two superposed supporting blades made of polymer material, and the paper material sheet 20 is fitted on a face of the two superposed supporting blades.

By way of example, the polymer material supporting blade(s) 22 may present thickness lying in the range 0.2 mm to 2 mm. When in the presence of at least one supporting blade 22, the paper material sheet 20 may present grammage that is less than that intended when the support 18 is constituted exclusively by paper material. For example, the paper material sheet may present grammage lying in the range 60 g/m$^2$ to 200 g/m$^2$.

The analysis plate 10 may include at least one ply of metal material. A "ply" should be understood as being an element or a portion of an element of the analysis plate 10 that extends in the extension plane of the analysis plate 10. The term "metal material" should be understood as covering metals and metal alloys.

The ply 24 of metal material is applied to the paper material sheet 20.

Preferably, the ply 24 of metal material may be applied directly to the paper material sheet 20 with only an optional layer of adhesive material such as a paste or an adhesive film being interposed between them, and without any other support layer being interposed, as shown in FIG. 2.

Preferably, a ply of metal material may be applied to the paper material sheet 20 on the same side as its test face 12.

By way of example, the ply 24 of metal material may be a ply of aluminum, or of an aluminum alloy. Nevertheless, it is possible to envisage using other metal materials, e.g. silver or silver alloys.

A ply 24 of metal material may be applied to the paper material sheet 20 by subjecting the paper material sheet 20 to vacuum metallization. Under such circumstances, the ply 24 of metal material may form the surface of the test face 12 of the analysis plate 10. Vacuum metallization is a technique for depositing a thin layer that is in widespread use in the papermaking industry. The metal that is to be deposited is evaporated from a solid metal source, by heating to a high temperature in an evacuated deposition chamber through which a substrate, e.g. a strip of paper material, is passed continuously. Particles that result from the evaporation become deposited directly on the paper material, where they condense to the solid state. Such vacuum metallization is typically obtained in a vacuum coating machine.

In another technique, such a ply 24 of metal material may be applied to the paper material sheet 20 by transfer metallization. An example of performing transfer metallization is described in detail in document FR 2 406 523 to which the person skilled in the art can refer. It should be observed that under such circumstances, and as shown in FIGS. 3A and 3B, the analysis plate 10 may comprise, starting from the test face 12:

- a layer of resin, e.g. an acrylic or an epoxy-acrylic resin 26;
- the ply 24 of metal material;
- an adhesive layer 28, e.g. a polyurethane adhesive comprising a single component in a solvent phase; and
- the paper material sheet 20.

An example of an embodiment of an analysis plate 10 of the invention, in the variant of FIG. 3A, is constructed as follows. A paper material sheet 20 constituted by cellulose fibers is obtained by using a foudrinier type papermaking machine. The paper 20 preferably includes at least one hydrophobic agent, which is mixed with the papermaking pulp prior to forming the sheet. The hydrophobic agent used is an aqueous emulsion of alkyl ketene dimer (AKD).

The paper sheet is coated on both faces with a pigment solution (not shown in the drawings), e.g. a solution of calcium carbonate or of Kaolin, e.g. by the air knife coating technique. Deposition is at about 10 g/m$^2$ on each face. This paper material sheet 20 possesses grammage of 250 g/m$^2$. Metallization is applied to a top face of this paper material sheet 20 by transfer metallization in compliance with the teaching of Document FR 2 406 523. A laminate is formed constituted by a polyethylene terephthalate (PET) base film, a release layer, an acrylic resin layer 26 having a thickness of about 2 μm, and a deposit 24 of aluminum alloy (having thickness lying in the range 10 nanometers (nm) to 100 nm, preferably 15 nm to 50 nm, more preferably about 20 nm), vacuum deposited on the resin layer 26 in order to form the metal material ply 24. The thickness of the metal layer may be measured by commercially-available thickness measuring apparatuses, in particular those making use of radiometric methods (X-ray fluorescence or beta backscattering) making it possible to achieve measurement resolution lying in the range 100 nm to a few Angstroms (Å). The laminate is assembled with the metal material ply 24 facing towards the paper sheet, using a layer of single-component solvent adhesive 28 against the top face of the paper sheet 20. The adhesive 28 may be one of those mentioned above. By way of example, the quantity of adhesive used may lie in the range 3 g/m$^2$ to 12 g/m$^2$. Thereafter, because of the release layer, e.g. based on chromic stearate chloride, the base film is separated so as to leave the adhesive layer 28, the metallization 24, and the resin layer 26 on the paper. In this embodiment, it should be observed that the surface of the test face 12 of the analysis plate 10 is formed by the layer 26 of resin that is not electrically conductive, covering the metal material ply 24.

Naturally, as mentioned above, such an analysis plate 10 may include other sheets of paper material and/or possibly one or more supporting blades.

Thus, FIG. 3B shows a variant embodiment that comprises all of the elements of the embodiment of FIG. 3A, except that the paper material sheet 20 presents grammage of 80 g/m$^2$ and includes an additional paper material sheet 20' assembled against the bottom face of the paper material sheet 20, i.e. the face opposite from the face on which the ply 24 of metal material is applied. Assembly may be performed by adhesive using an adhesive layer 28'. The adhesive 28' may be one of those mentioned above. By way of example, the additional paper material sheet 20' presents grammage of 170 g/m$^2$.

In another embodiment, a PET film previously covered in an anti-adhesive layer based on chromic chloride stearate is coated with an epoxy/acrylic resin that is dried. This coated face is inserted into a metal coating machine so as to receive a deposit of aluminum that is about 20 nm thick. The metallized face is coated with a single component polyurethane adhesive in solvent phase by direct computer coating. It is dried prior to being laminated with a 90 g/m$^2$ Satimat® paper from the supplier Arjowiggins. The following day, the PET film is peeled from the surface of the paper so as to leave the metal deposit visible on the paper. This assembly is then adhesively bonded onto a support assembly comprising at least one supporting blade, e.g. using a Super-Lok® 364 paste from the supplier National Starch. Preferably, the support assembly comprises two supporting blades, each of which is made from a Priplak® Classic Black 800 polypropylene plate having a thickness of 800 μm. By way of example, the two supporting blades are adhesively bonded to each other by using a Super-Lok® 364 paste from the supplier National Starch.

In general manner, tests have shown that an analysis plate 10 including a metal material ply, in particular a ply made of aluminum or aluminum alloy, and applied to a top face of a paper material sheet 20, as shown in FIG. 3A or 3B, can form an analysis plate 10 that is entirely satisfactory, enabling analysis results to be obtained with the same reliability as a reference plate.

In particular, satisfactory results have been obtained with a metal material ply, in particular made of aluminum or aluminum alloy, presenting thickness of less than 0.5 μm, or indeed less than 0.1 μm, or even less than 0.05 μm.

This thin ply of metal material may be the only electrically conductive ply of the analysis plate 10, including in the presence, if any, of a layer of nonconductive material, specifically the resin layer 26, above the metal material ply 24.

Nevertheless, tests have shown that a metal material ply 24, and in particular a ply made of aluminum or of aluminum alloy, should preferably present a thickness greater than 0.01 μm. Such a thickness serves in particular to avoid the ply being degraded while the analysis chamber is being evacuated.

It should be observed that tests performed in the absence of the metal material ply have not enabled satisfactory results to be obtained when performing mass spectrometry analysis using the MALDI-TOF technique.

For example, an analysis plate constituted exclusively by a sheet of Powercoat HD 230 paper from the supplier Arjowiggins, which is an extremely smooth coated paper having a thickness of 222 μm and grammage of 219 g/m$^2$, does not give satisfaction, with only a few peaks being detected, and with a spectrum of poor quality. Other tests with analysis plates that do not include a metal material ply applied to the test surface have not given satisfaction, including with a paper material sheet having grammage of 300 g/m$^2$.

Preferably, each analysis zone 16 of the test face 12 is identified at least visually on the test face 12.

To do this, an analysis zone may be defined on the test face by the presence of mechanical deformation of the analysis plate 10, in particular mechanical deformation of the paper material sheet 20.

Figure 5A:
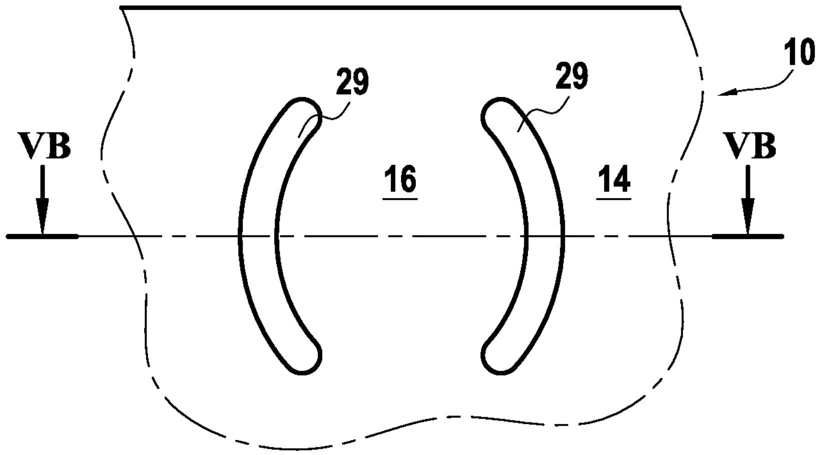
FIG. 5A is a plan view of a portion of the test face of an analysis plate of the invention, showing more particularly a first embodiment of marking for a test zone.
Figure 5B:
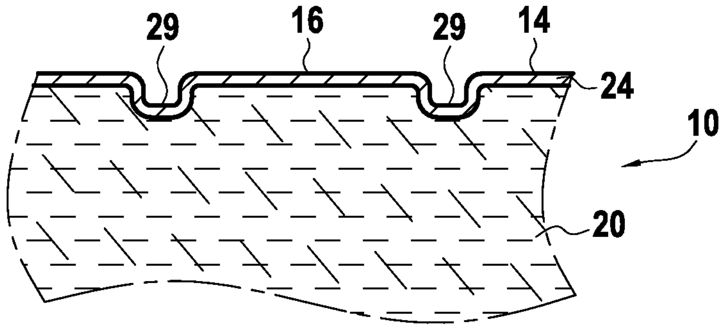
FIG. 5B is a cutaway diagrammatic fragmentary cross-sectional view showing the marking of FIG. 5A being made by mechanical deformation.

For example, in the example shown in FIGS. 5A and 5B, in order to define at least one analysis zone 16, the paper material sheet 20 is mechanically deformed with the outline of the analysis zone, and specifically in this example with a portion of the outline of the analysis zone. Specifically, it can be seen that the analysis zone 16 is a circular zone having a portion of its outline defined by a groove 29. In this example, the groove 29 is made up of two portions, each in the form of a circular arc, with the two portions facing each other. This groove 29 may be obtained by indenting the test face 12 in the thickness direction of the analysis plate 10, thereby plastically deforming the paper material sheet 20 so as to obtain mechanical deformation that is permanent.

Figure 6A:
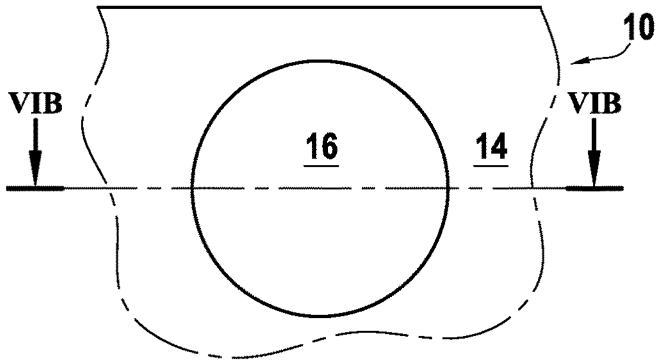
FIGS. 6A and 6B are views similar to the views of FIGS. 5A and 5B, showing a variant embodiment.
Figure 6B:
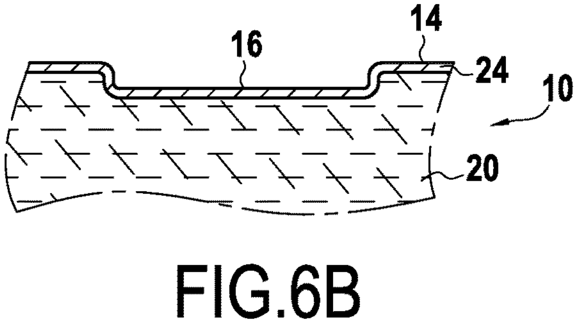

In the variant shown in FIGS. 6A and 6B, the paper material sheet is mechanically deformed over the entire extent of the analysis zone, in the form of a flat-bottomed dish.

Figure 7A:
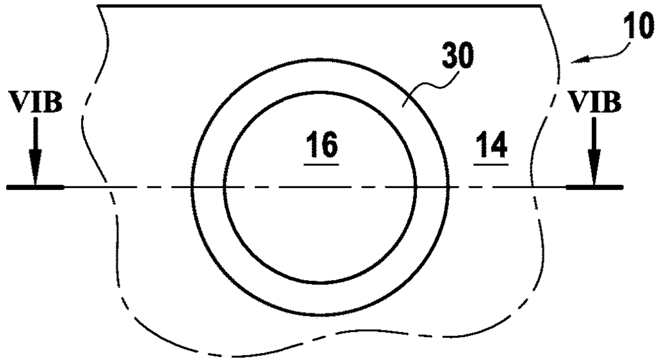
FIGS. 7A and 7B are views similar to the views of FIGS. 5A and 5B, showing another variant embodiment.
Figure 7B:
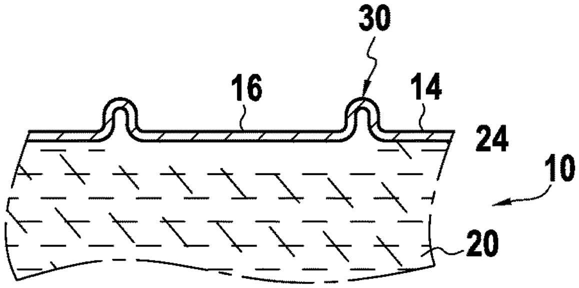

In the variant shown in FIGS. 7A and 7B, the paper material sheet is mechanically deformed over the entire extent of the analysis zone 16, and also around the analysis zone 16, so as to leave a projecting remnant 30 that extends circularly in the example shown all along the outline of the analysis zone 16. The analysis zone 16 is thus recessed relative to the top of the rim 30, thereby forming a dish as in the above example.

In the examples shown in FIGS. 5B, 6B, and 7B, the paper material sheet 20 is covered by a metal material ply 24 forming the test face 12, and this metal material ply 24 is likewise deformed so as to form the groove 29, or the flat bottomed dish, or the rim 30. The same result is obtained with an analysis plate that presents the structure shown in FIG. 3, in which the ply 24 of metal material is obtained by transfer metallization, including in the additional presence, if any, of one or more supporting blades 22, as mentioned above.

By way of example, the depth of the permanent mechanical deformation may lie in the range 10 μm to 300 μm.

In both situations, it can be understood that the mechanical deformation that defines the analysis zone 16 makes it possible to define it not only visually, but also to form a barrier preventing the sample and/or the reagent(s) and/or the matrix from propagating while being deposited on the analysis plate 10.

Because the paper material sheet 20 presents little resistance against being indented in the direction of its thickness, this mechanical deformation can easily be performed by using conventional embossing techniques as used in the papermaking industry. In particular, such embossing may be performed in-line, e.g. while the support is still in the form of a continuous strip.

Furthermore, in order to define at least one analysis zone 16, the analysis plate may include marking using ink. Such marking is preferably applied to the test face 12.

By way of example, the marking may present a shape analogous to the shape of the mechanical deformation shown in the examples of FIG. 5A, 6A, or 7A.

In an advantageous embodiment, the marking may be performed on the test face 12, preferably over the entire extent of the analysis zone 16, using an ink that, once dry, presents a wetting angle for the sample and/or the matrix that is different from the wetting angle for the sample and/or the matrix of the surface of the material constituting the test face 12. Preferably, the wetting angle between the ink and the sample and/or the matrix is smaller than the wetting angle between the surface of the material constituting the test face 12 and the sample and/or the matrix, e.g. when using the AGFA Orgacon™ EL-P3145 ink sold by AGFA GEVAERT N.V. or its affiliates. In other words, the surface of the ink, once dry, is more hydrophilic than the surface of the test face 12. In this way, the ink serves to facilitate depositing the sample and/or the matrix while in the liquid phase, with the difference between the wetting angles of the ink and of the surface of the material constituting the test face 12 forming a barrier that serves to prevent, or at least to limit, any spreading of the deposit, tending to confine it within the analysis zone 16 as marked by the ink.

Nevertheless, provision may also be made for the ink to be deposited, not on the analysis zone 16, but rather around it, and by way of example it is then possible to make provision for the wetting angle between the ink and the sample and/or the matrix to be greater than the wetting angle between the surface of the material constituting the test face 12 and the sample and/or the matrix. By way of example, this can be done with DuPont™ 5064H ink sold by E.I. du Pont de Nemours and Company or its affiliates, which presents a wetting angle relative to water or formic acid that is greater than the wetting angle of the surface of the transfer metallized paper support. This ink is electrically conductive. The values given below are wetting angles in degrees as a function of time measured using a Dynamic Absorption Tester apparatus from Testing Machines, Inc (TMI), which uses the TAPPI 558 method.

| | FIG. 3A type metallized paper | | | DuPont ™ 5064H ink on FIG. 3A type metallized paper | | |
|---|---|---|---|---|---|---|
| | t = 01 s | t = 1 s | t = 10 s | t = 0.1 s | t = 1 s | t = 10 s |
| $H_2O$ | 83.8 | 82.3 | 80.4 | 113.8 | 111.8 | 111.5 |
| Formic acid | 41.8 | 38.2 | 29.8 | 68.2 | 64.8 | 47.6 |

In an advantageous embodiment, the marking may be made on the test face 12, preferably over the entire extent of the analysis zone 16, using an electrically conductive ink.

The marking by depositing ink may be performed by any known technique, and in particular any technique used in the printing industry, e.g. such as electro-photography, inkjet printing, silkscreen printing, flexographic printing, or offset printing.

Naturally, it is possible to combine defining the analysis zone by mechanical deformation of the paper material sheet with defining the analysis zone by marking using an ink. Thus, in the example described and shown in FIG. 5A, it is possible to use an ink to mark the circular zone defined by the groove 28. In the examples shown in FIGS. 6A and 7A, it is possible to make provision for marking the flat bottom of the dish with an ink.

In the above-mentioned examples, the analysis zone 16 is a small surface, e.g. presenting roughness that is comparable with, or even less than, the roughness of the paper material sheet 20.

Nevertheless, in order to facilitate the deposition step, it is possible to make provision for the surface of the analysis zone 16 to be structured. Preferably, this structuring is obtained by mechanically deforming the surface, and in particular by mechanically deforming the paper material sheet 20. This structuring may thus form indentations and projections on the surface of the analysis zone 16, in a pattern that is regular or irregular. The relative depth between the indentations and the projections of the surface of the structured analysis zone may lie in the range 10 μm to 300 μm, for example. The pattern and the relative depth of the indentations and of the projections of the surface of the structured analysis zone 16 may vary over the extent of the analysis zone 16, e.g. by varying the shape, the size, the pitch, and/or the depth of the indentations or the projections.

FIGS. 12A to 12F show various possible kinds of structuring.

Figure 12A:
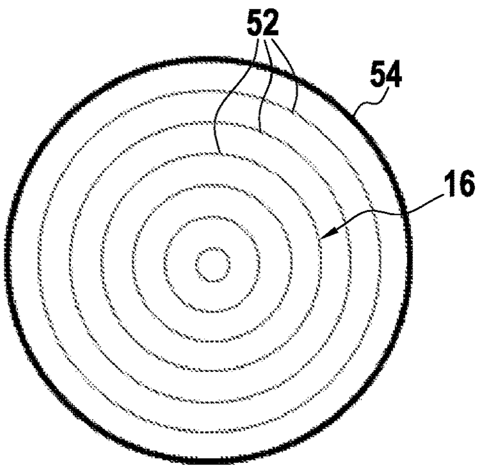
FIGS. 12A to 12E are diagrammatic views showing different structuring variants for the analysis plate.

In FIG. 12A, the structuring is constituted by concentric circular lines 52 forming indentations or projections relative to the surface of the analysis zone 16. By way of example, the circular lines are equidistant from one another, but they could have varying spacing that is not constant. By way of example, the circular lines 52 are distributed over the entire extent of the analysis zone 16. By way of example, the circular lines are concentric with a circular outline 54 of the analysis zone 16.

Figure 12B:
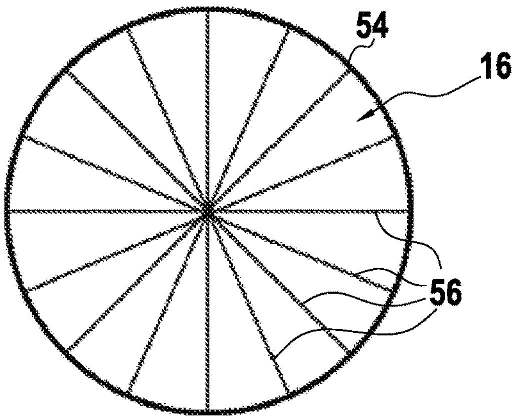

In FIG. 12B, the structuring is formed by radial lines 53 extending from a common central point of the analysis zone 16 as indentations or projections relative to the surface of the analysis zone 16. By way of example, the radial lines may be spaced apart angularly from one another by an angle that is constant, however they could also present varying spacing that is not constant. By way of example, the radial lines are distributed over the entire extent of the analysis zone 16. By way of example, the radial lines may extend from the center of a circular outline 54 of the analysis zone 16.

Figure 12C:
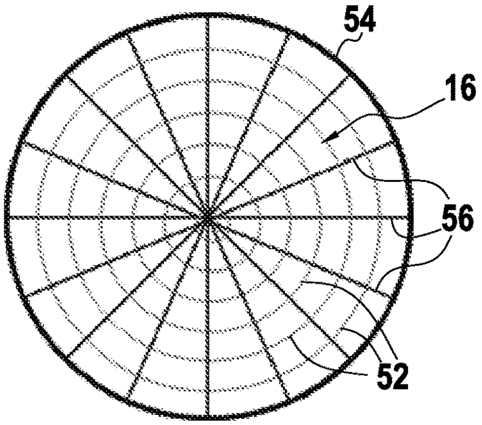

In FIG. 12C, the structuring is formed by concentric circular lines 52 as shown in FIG. 12A together with radial lines 56 as shown in FIG. 12B.

Figure 12D:
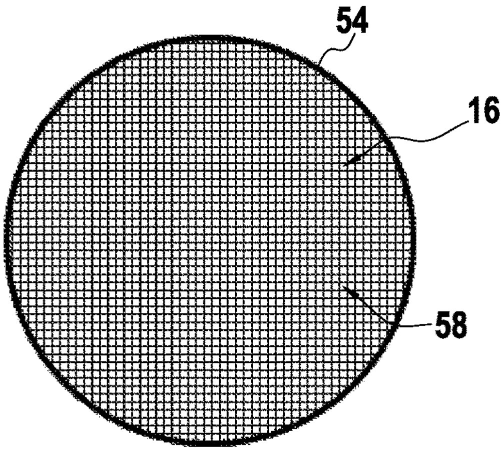

In FIG. 12D, the structuring is formed by lines that are indented or projecting relative to the surface of the analysis zone 16, forming a grid 54. The grid 58 may be a square grid formed by two perpendicular series of parallel straight lines, however it is also possible to envisage two series of non-perpendicular parallel straight lines, or more than two series of parallel lines, each series having a different orientation. By way of example, within any one series of parallel lines, the lines may be equidistant from another, but they could present varying spacing that is not constant. By way of example, the grid 58 extends over the entire extent of the analysis zone 16. Nevertheless, the grid could be limited to a portion only of the analysis zone 16, e.g. a peripheral ring of the analysis zone 16.

Figure 12E:
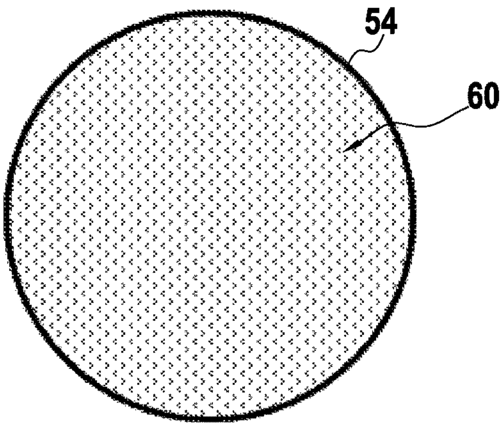
Figure 12F:
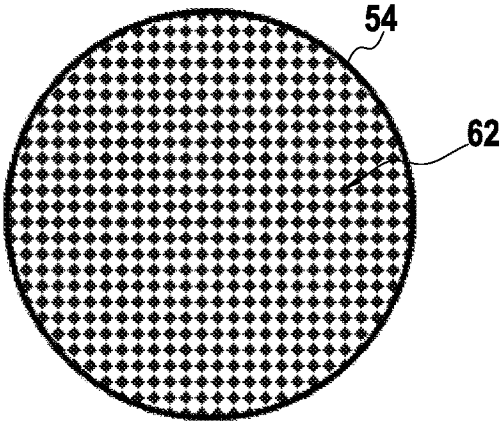

In FIG. 12E, the structuring is made up of a multitude of repeated geometrical elements, forming a repetitive pattern 60 of indentations or projections relative to the surface of the analysis zone 16 In FIG. 12F, the structuring is made up of a repetitive chequerboard pattern 60 of indentations or projections relative to the surface of the analysis zone 16. In both situations, and by way of example, the pattern 60, 62 extends over the entire extent of the analysis zone 16. Nevertheless, the grid could be limited to a portion only of the analysis zone 16, e.g. a peripheral ring of the analysis zone 16.

On the active face 12 of the analysis plate 10, provision could be made for only the or each analysis zone to be provided with structuring as described above. Nevertheless, it is also possible to provide for at least a portion of the active face 12 of the analysis plate 10, outside the analysis zone(s) 16 also to be provided with structuring as described above, or indeed for the entire active face 12 of the analysis plate 10 to be provided with structuring as described above.

The embodiments of an analysis plate 10 of the invention enable the analysis plate 10 to be made out of materials and using techniques that are commonplace in the papermaking industry, and they enable an analysis plate 10 to be obtained at a cost that is very low, not only from the point of view of the cost of the materials used, but even more so from the point of view of the cost of the fabrication methods used.

Specifically, the cost of the paper materials and the cost of producing them and working them in order to fabricate analysis plates of the invention is very low compared with the cost of the materials and the cost of producing analysis plates as known in the prior art. Specifically, the metal analysis plates that had been used in the prior art are expensive to produce. Prior art polymer material analysis plates, which are generally made by injection molding analysis plates individually, are also relatively expensive.

Figure 8:
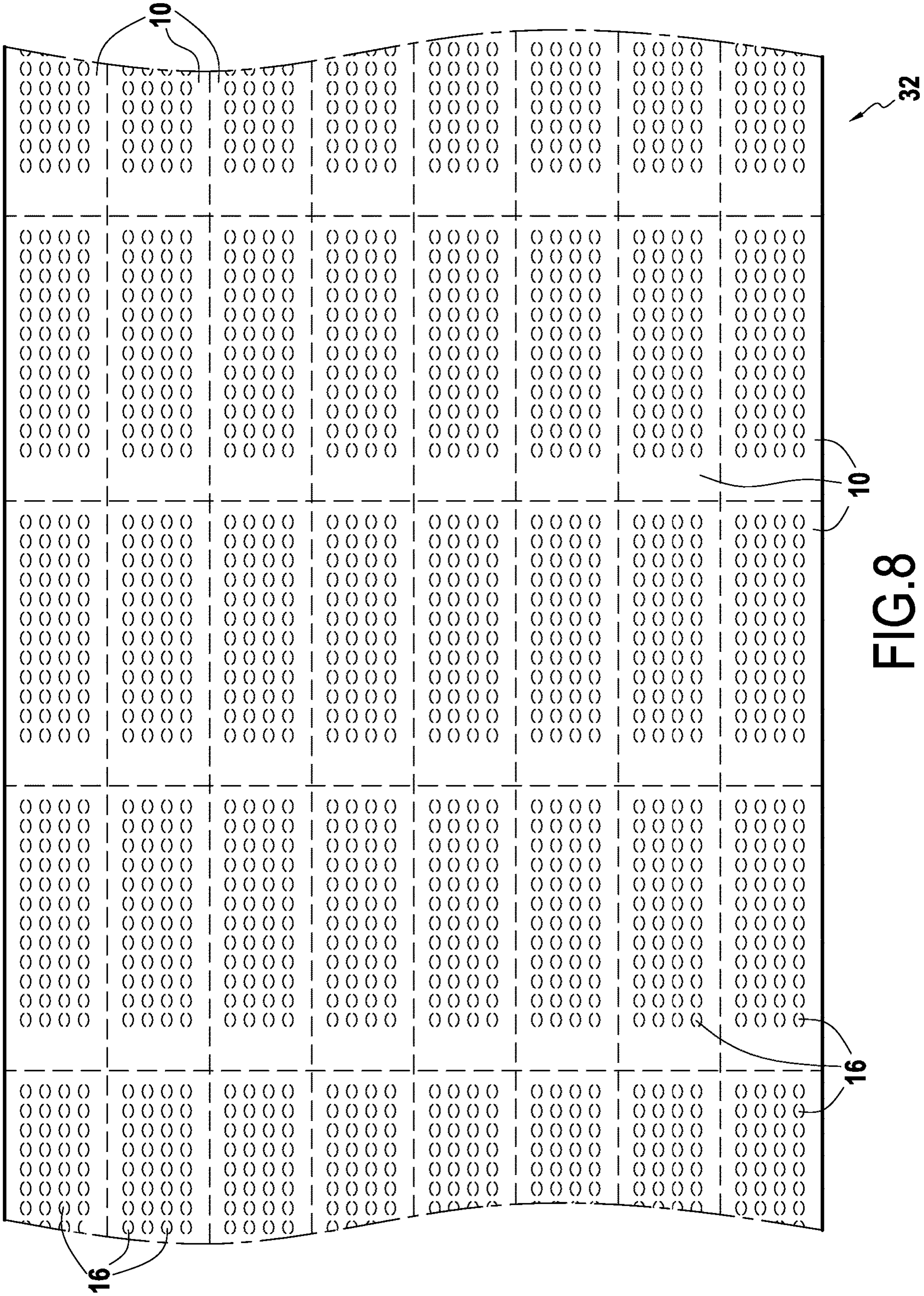
FIG. 8 is a diagram showing a plurality of analysis plates being made by cutting up a strip.
Figure 9A:
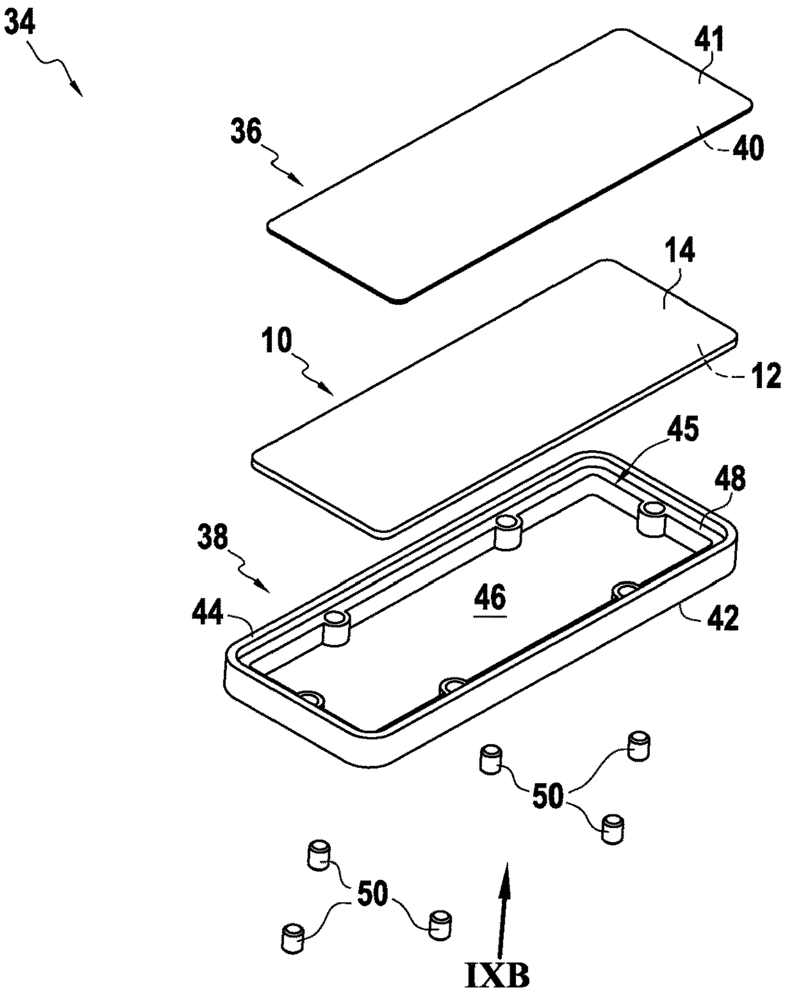
FIG. 9A is an exploded diagrammatic perspective view showing the use of an analysis plate of the invention with an adapter, the elements being shown from beside their bottom faces, in particular from beside the back face of the analysis plate.
Figure 9B:
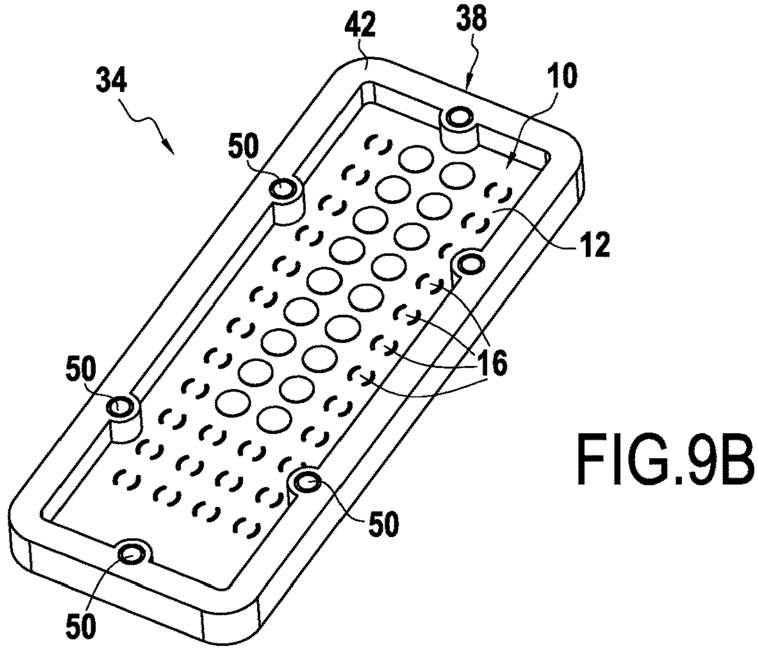
FIG. 9B is a diagrammatic perspective view showing the use of an analysis plate of the invention with the FIG. 9A adapter, seen from beside the test face of the analysis plate.
Figure 10:
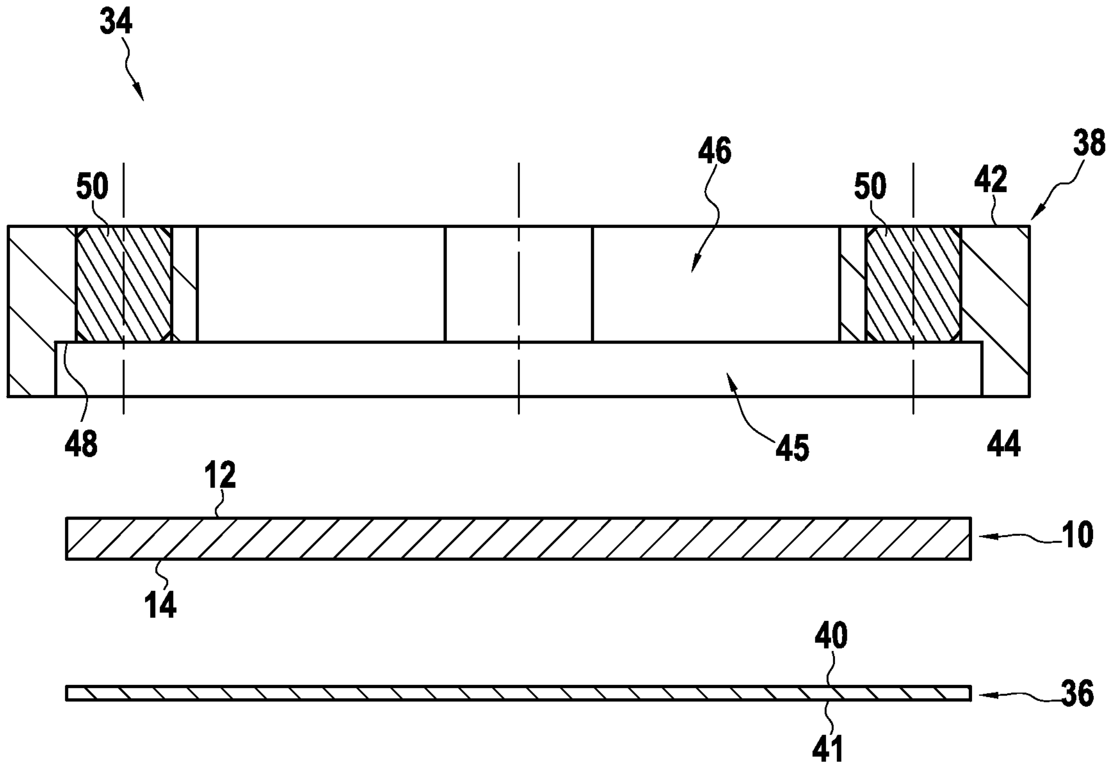
FIG. 10 is a diagrammatic exploded cross-section view of the FIG. 9B assembly.
Figure 11:
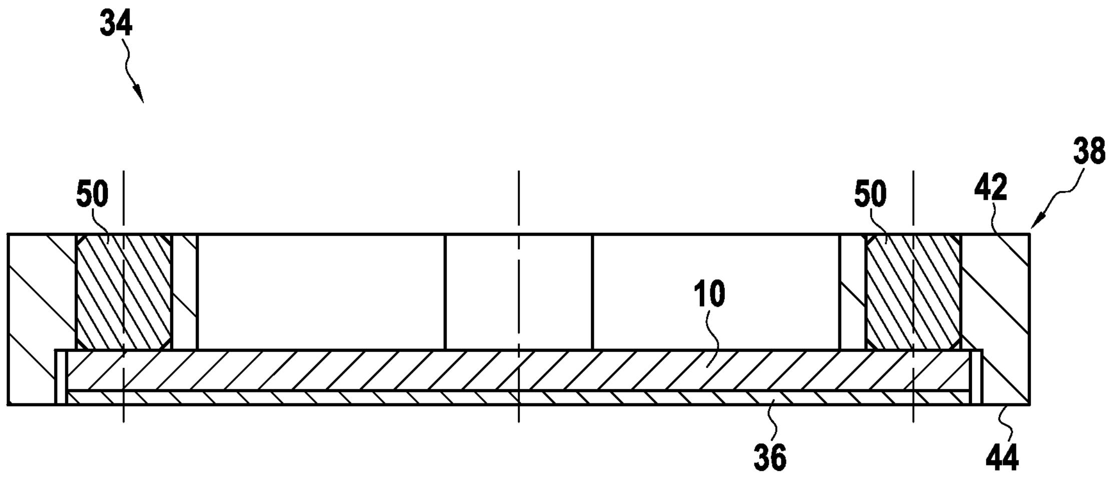
FIG. 11 is a diagrammatic cross-sectional view showing the FIG. 9B assembly in its in-use configuration.

As shown in FIG. 8, an analysis plate 10 in accordance with the invention can be fabricated by cutting individual analysis plates 10 from a strip of material 32 that is produced at very low cost. This strip of material 32 may comprise the assembly of the paper material sheet(s) 20, the supporting blade(s) 22, the metal material ply 24, etc. . . . as envisaged for making the analysis plate 10 of the invention, preassembled in a laminate suitable for being obtained in-line as a strip of great length. Likewise, the operations of marking by mechanical deformation or the operations of marking by depositing ink can make use of the corresponding techniques that are used in the printing industry, once more performed in-line on strips of great length.

Thus, it is possible to provide an operation of cutting out the analysis plate 10 to its final dimensions from such a preassembled laminate, as a final step in the method of fabrication, or in any event as a step subsequent to making the laminate. Naturally, certain steps such as marking by mechanical deformation or by depositing ink could be performed after such a cutting out operation.

This results in a cost of producing the analysis plate that is very low, in particular when using mass production methods based on papermaking techniques, in particular methods of the "roll-to-roll" type enabling the fabrication method to be automated without any human intervention or with minimal human intervention.

Contrary to expectations, it has been found that analysis plates made in compliance with the teaching of the invention make it possible, with standard apparatus, to achieve characterizations of samples that comply with the characterizations generally obtained with prior art analysis plates.

Specifically, with analysis plates as described above with reference to FIG. 3A, it is possible with MALDI-TOF analysis to detect numerous bacterial strains, peptides, or proteins, and with the same accuracy as with a prior art reference plate. In particular, identification on analysis plates of the invention has been found to be as good as identification on commercially-available VITEK® MS analysis plates, and to be 100% correct. Identification probabilities have been found to be similar with an average of 98.4% for the reference, 96.5% for an analysis plate of the invention as described with reference to FIG. 3A, in its smooth version, and 98% for an analysis plate of the invention, likewise as described with reference to FIG. 3A, but in its structured version. The mass spectroscopy (MS) spectra were likewise comparable, presenting the same resolution, the same number of peaks, and the same dynamic range.

All of the peptides and proteins tested with the different matrix have been detected on the analysis plate of the invention, in its smooth version, with the same quality as on the reference target. The tests were carried out on 22 species of bacteria and on yeasts, having masses lying in the range 2000 Daltons (Da) to 20,000 Da, and with peptides and proteins of mass lying in the range 300 Da to 46,000 Da.

A plate of the invention is thus advantageously used as a sample support in a method of analyzing the sample by mass spectrometry using the MALDI-TOF technique.

For use in standard apparatus for mass spectrometry using the MALDI-TOF technique, the inventors have designed an adapter 34 that makes it possible to use analysis plates 10 of the invention, and in particular analysis plates as shown in above-described FIGS. 3A and 3B, which plates present thickness that is smaller than the thickness of conventional analysis plates.

The adapter 34 holds the analysis plate 10 via its periphery and enables the paper material sheet 20 to be positioned in the analysis chamber of the apparatus in such a manner that the test face 12 of the analysis plate 10 is situated in a position in the direction perpendicular to its extension plane that is equivalent to the position of a conventional analysis plate, in spite of the difference in thickness between them.

If an example of an adapter 34, as shown in FIGS. 9A, 9B, 10, and 11, the adapter 34 comprises a tray 36 and a frame 38.

The tray 36 is plane in shape, and its dimensions are equal to the dimensions of the analysis plate 10 in the extension plane of the plate. The tray 36 has a top face 40 that is to receive the back face 14 of the analysis plate 10, and a bottom face 41.

The frame 38 is in the form of a section member lying in a plane parallel to the extension plane of the analysis plate 10 and around the periphery of the analysis plate 10. The frame 38 thus presents a top face 42 and a bottom face 44. A setback 45 is arranged in the bottom face 44 and presents the exact outline of the analysis plate 10. In the direction perpendicular to the extension plane of the analysis plate 10, the depth of the setback 45 is preferably greater than the thickness of the analysis plate 10. In the example shown, this depth corresponds substantially to the sum of the thickness of the analysis plate 10 plus the thickness of the tray 36, which can then likewise be received, at least in part, in the setback 45. In its top face 42, the frame 38 defines an opening 46 of dimensions in the extension plane that are sufficient to allow all of the analysis zones 16 of the analysis plate 10 to be apparent through this opening 46 when the analysis plate 10 is engaged in the setback 45 in the bottom face 44 of the frame 38, with its test face 12 on top. In contrast, in the extension plane of the plate 10, the opening 46 presents dimensions that are smaller than the dimensions of the plate 10 so that the bottom of the setback 45 in the frame 38 forms an abutment surface 48 against which the periphery of the test face 12 of the analysis plate 10 comes to bear.

In an advantageous embodiment, the adapter 34 also includes a clamping mechanism that serves to clamp the analysis plate 10 between the frame 38 and the tray 36. In the example shown, the clamping mechanism is a magnetic mechanism comprising a series of magnets 50. In the example shown, the magnets 50 are carried by the frame 38, such that the tray 36 is made at least in part out of a ferromagnetic material, e.g. a ferromagnetic metal and/or itself also includes corresponding magnets that are arranged with opposite magnetic polarity. Naturally, it is possible to provide the opposite configuration. Other clamping mechanisms can be envisaged, e.g. using clips or screws. Nevertheless, a magnetic mechanism presents the advantage of being very easy to use and provides a clamping force that is sufficient to hold the plate 10 without damaging it, in particular by avoiding excessive clamping and accommodating a variable range of paper thicknesses without modifying the adapter.

Depending on the depth provided for the setback 45, it is either the bottom face 44 of the tray 38 or else the bottom face of the tray 36 that comes to rest against a reception face of the analysis chamber. The depth of the setback 45 in the frame 38 and the thickness of the tray 36 thus determine the position of the test face 12 of the analysis plate 10 in the analysis chamber in a direction perpendicular to the extension plane of the plate 10, depending on which one of them rests against the reception face of the analysis chamber. Thus, the depth of the setback 45 in the frame 38 and the thickness of the tray 36 are determined so that the test face 12 of the analysis plate 10 is arranged at a desired altitude in a direction perpendicular to the extension plane of the plate 10, suitable for proper operation of the apparatus.

Using an adapter 34 makes it possible to avoid any damage to the analysis plate 10 while it is being handled, in particular while it is being inserted in the mass spectrometry apparatus. It is thus possible to handle only the adapter 34, which may be made out of plastics material and/or of metal. In particular this avoids any risk of bending an analysis plate 10 that is thin, e.g. having a support 18 constituted solely by one or more paper material sheets 20, 20' without the presence of any additional supporting blade.

Furthermore, when the dimensions of the adapter 34 are designed to position the test face 12 of the analysis plate 10 at a height relative to the reception face of the analysis chamber that is identical to the height of the test face of a conventional analysis plate, the same apparatus can be used equally well with a conventional analysis plate or with an analysis plate of the invention without any need to re-calibrate the mass peaks.

The invention is not limited to the examples described and shown since various modifications can be made thereto without going beyond its ambit.

The invention claimed is:

1. A MALDI-TOF analysis plate for the analysis of a biological sample, comprising:

a planar support comprising a top face and a bottom face wherein the planar support comprises at least one sheet of paper material having cellulose fibers; and at least one ply of a metal material disposed on the top face of the planar support, wherein: the at least one ply of metal material extends over an entirety of the top face of the planar support;

the at least one ply of the metal material defines at least one test face including at least one analysis zone on the at least one analysis zone has a roughness of less than 750 mL/min;

a mechanical deformation is formed in the ply of metal material and the at least one sheet of paper material, and the mechanical deformation outlines the at least one analysis zone or forms a barrier that encloses the at least one analysis zone so as to prevent the biological sample from leaving the analysis zone after the biological sample is deposited; and the at least one analysis zone enables the biological sample, when deposited on the at least one analysis zone, to be analyzed by mass spectrometry using a MALDI-TOF technique.

2. The analysis plate according to claim 1, wherein the ply of metal material is applied to the at least one sheet of paper material by subjecting the at least one sheet of paper material to vacuum metallization.

3. The analysis plate according to claim 1, wherein the ply of metal material is applied to the at least one sheet of paper material by transfer metallization.

4. The analysis plate according to claim 1, wherein the metal material ply has a thickness of less than 0.5 μm.

5. The analysis plate according to claim 1, wherein the metal material ply comprises aluminum.

6. The analysis plate according to claim 1, wherein the fibers of the paper material sheet comprise cellulose fibers exclusively.

7. The analysis plate according to claim 1, wherein the at least one sheet of paper material comprises both cellulose fibers and synthetic fibers.

8. The analysis plate according to claim 7, wherein the at least one sheet of paper material comprises cellulose fibers and synthetic fibers, with the weight of the cellulose fibers being greater than the weight of the synthetic fibers.

9. The analysis plate according to claim 1, wherein the at least one sheet of paper material comprises at least one hydrophobic agent.

10. The analysis plate according to claim 1, wherein the at least one sheet of paper material has a grammage greater than, or equal to, 120 $g/m^2$.

11. The analysis plate according to claim 1, wherein the at least one sheet of paper material has a grammage less than, or equal to, 400 $g/m^2$.

12. The analysis plate according to claim 1, wherein the planar support further comprises at least one supporting blade such that a face of the least one supporting blade forms the bottom face of the planar support.

13. The analysis plate according to claim 12, wherein the at least one supporting blade is made of polymer material.

14. The analysis plate according to claim 12, wherein the planar support includes two superposed supporting blades of polymer material, and wherein the at least one sheet of paper material is applied to a face of one of the two superposed supporting blades.

15. The analysis plate according to claim 13, wherein the supporting blade has a thickness in a range of 0.2 mm to 2 mm.

16. The analysis plate according to claim 1, wherein the at least one sheet of paper material has a grammage in a range of 60 $g/m^2$ to 200 $g/m^2$.

17. The analysis plate according to claim 12, wherein the at least one sheet of paper material is adhesively bonded on the supporting blade.

18. The analysis plate according to claim 1, wherein the mechanical deformation extends over the entire extent of said at least one analysis zone.

19. The analysis plate according to claim 1, wherein the analysis plate includes ink marking defining the at least one analysis zone.

20. A method of analyzing a biological sample, comprising:

supporting the biological sample on the analysis plate according to claim 1, and analyzing the biological sample by mass spectrometry using a MALDITOF analysis.

21. The method according to claim 20, wherein the analysis plate is used with an adapter that holds the at least one sheet of paper material by a periphery of the at least one sheet of paper material.

22. The method according to claim 21, wherein the adapter comprises a tray, a frame, and a clamping mechanism that causes the analysis plate to be clamped between the frame and the tray, the frame cooperating with the periphery of the analysis plate and including an opening that allows the at least one analysis zone of the analysis plate to appear.

23. The analysis plate according to claim 1, further comprising at least one layer of resin disposed on the at least one ply of the metal material opposite of the planar support so as to form the test face.

24. A MALDI-TOF analysis plate for the analysis of a biological sample, comprising:

a planar support comprising a top face and a bottom face wherein the planar support comprises at least one sheet of paper material having cellulose fibers; and at least one ply of a metal material disposed on the top face of the planar support, wherein: the at least one ply of metal material extends over an entirety of the top face of the planar support;

the at least one ply of the metal material has a thickness that is greater than 0.01 μm and less than 0.5 μm;

the at least one ply of the metal material, optionally with at least one layer of resin disposed on the at least one ply of the metal material, forms at least one test face including at least one analysis zone on the planar support;

the at least one analysis zone is defined by a mechanical deformation and has a roughness of less than 750 mL/min;

the mechanical deformation is formed in the ply of metal material and the at least one sheet of paper material, and the mechanical deformation outlines the at least one analysis zone or forms a barrier that encloses the at least one analysis zone so as to prevent the biological sample from leaving the analysis zone after the biological sample is deposited; and the at least one analysis zone enables the biological sample, when deposited on the at least one analysis zone, to be analyzed by mass spectrometry using a MALDI-TOF technique.

* * * * *